United States Patent [19]

Hignette

[11] Patent Number: 5,124,563
[45] Date of Patent: Jun. 23, 1992

[54] OPTICAL SCANNING METHOD AND DEVICE FOR MEASURING THE WIDTH OF LINES

[75] Inventor: Olivier Hignette, St Germain les Corbeil, France

[73] Assignee: Micro-Controle, France

[21] Appl. No.: 527,421

[22] Filed: May 24, 1990

[30] Foreign Application Priority Data

May 24, 1989 [FR] France .................. 89 06805

[51] Int. Cl.[5] ........................................... G01N 21/86
[52] U.S. Cl. ..................... 250/560; 356/387
[58] Field of Search ............ 250/560; 356/376, 381, 356/383, 384, 387, 357, 359, 362, 355

[56] References Cited

U.S. PATENT DOCUMENTS

| 3,563,665 | 2/1971 | Takahashi et al. | 356/376 |
| 4,112,309 | 9/1978 | Nakazawa et al. | 250/560 |
| 4,485,309 | 11/1984 | Johansson et al. | 250/560 |

FOREIGN PATENT DOCUMENTS 0195405 9/1986 European Pat. Off.
2554086 6/1977 Fed. Rep. of Germany.

OTHER PUBLICATIONS

Philips Technical Review, vol. 43, No. 7, Jul. 1987, pp. 184-191, Eindhoven, NL; G. Prast: "Quantitative Measurements By The Schlieren Method", pp. 188-190.

Primary Examiner—David C. Nelms
Assistant Examiner—John R. Lee
Attorney, Agent, or Firm—Larson and Taylor

[57] ABSTRACT

The width of a line projecting out of or recessed on a medium such as an integrated circuit is measured. A device for that purpose includes a confocal optical assembly having a monomode light source delivering a beam having a flat wave front. An optical deflector scans the surface of the medium transversely to the line width of the beam. A separator separates the light beam directed towards the medium carrying the line from the beam reflected by the medium. A detector includes a blade placed at a position conjugate with the focal point of the optical assembly and orthogonal to the line whose width is to be measured and a differential sensor placed at a position conjugate with the pupil of the optical assembly and delivering a signal responsive to the difference of lighting on each side of the blade for comparison with a threshold.

7 Claims, 1 Drawing Sheet

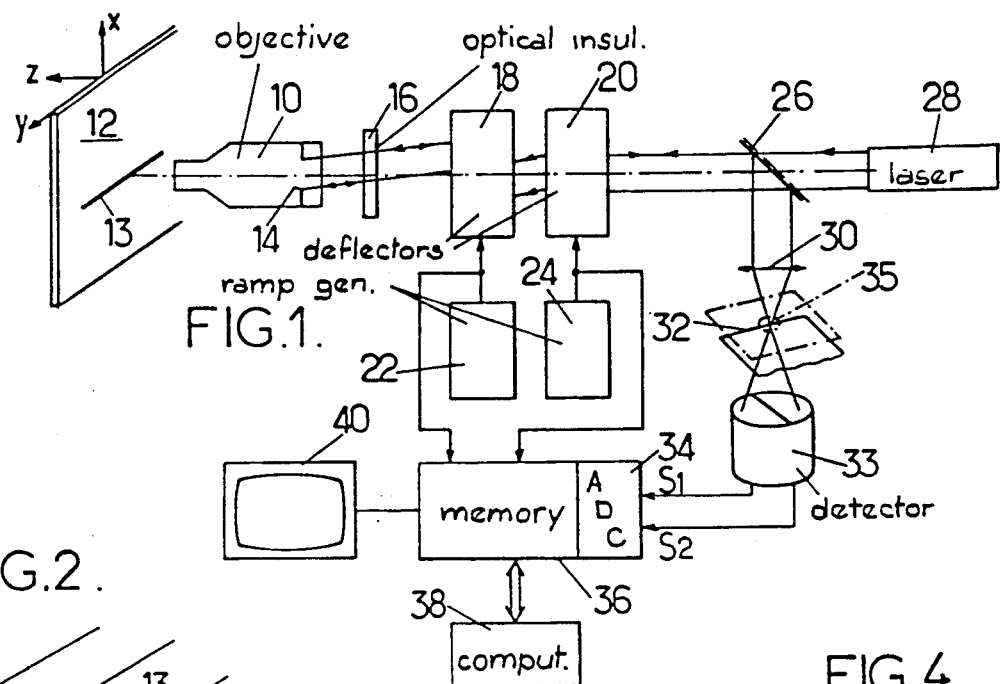
FIG.1.
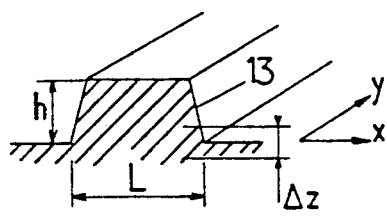
FIG.2.
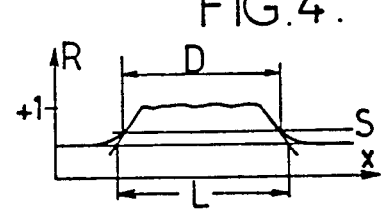
FIG.4.
FIG.3.
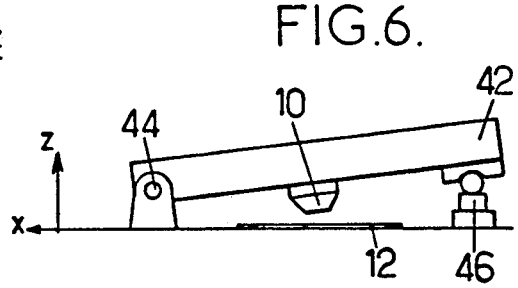
FIG.6.
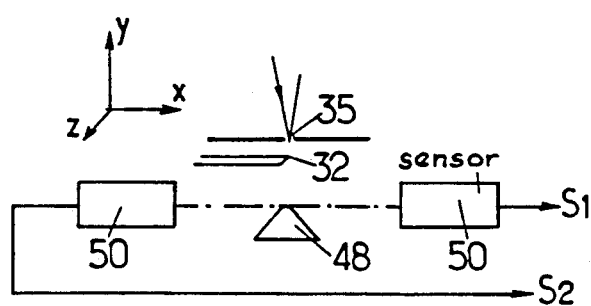
FIG.5.

OPTICAL SCANNING METHOD AND DEVICE FOR MEASURING THE WIDTH OF LINES

BACKGROUND OF THE INVENTION

1. Technical Field

The invention relates generally to optical metrology and more particularly to the measurement of the width of narrow lines projecting from or recessed in a medium; it finds a particularly important application in the measurement of the width of lines obtained by photolithography during the manufacture of integrated circuits and then makes dimensional monitoring of such circuits possible.

2. Prior Art

In this particular field, there exists a need for checking the width of lines obtained by photolithography using a photosensitive resin. Optical methods have already been used, working with visible light. But a problem is encountered: many thin layered materials are transparent to visible light. This is particularly true for the photosensitive resins used in the manufacture of integrated circuits. The transparency results in optical resonance, wave channelling, interference and diffraction optical problems which can only be corrected accurately for small thicknesses not exceeding about 0.5 $\mu$m. This limitation is all the more troublesome in that at the present time resin layers are used whose thickness exceeds 1 $\mu$m.

Furthermore, most of the existing methods have insufficient repeatability and linearity.

SUMMARY OF THE INVENTION

It is a main purpose of the present invention to provide a method and device fulfilling better than those known heretofore the requirements of practice, particularly in that they overcome the problems related to the transparency of many thin layered materials and ensure the repeatability and linearity of response, whatever the variations in the reflectivity of the medium carrying the lines.

To this end, the invention provides particularly a method for the optical measurement of the width of a line projecting out of or recessed on a medium, including: scanning the surface of the medium along a direction orthogonal to the line with a confocal optical system having a transverse monomode light source, measuring the variations of the output signal of a differential detector associated with a knife optically conjugated with the focal point of the optical system on the support and oriented orthogonally to the line, and deriving therefrom the profile at the base of the sides of the line in a linearity zone of the measurement.

It is known that a confocal optical assembly comprises a pin point light source and a detector, generally substantially point shaped, whose image is focused at the same position on the medium to be observed.

The invention also provides a device for measuring the width of a line projecting out of or recessed on a medium, particularly suitable for checking the width of lines on integrated circuits during manufacture, comprising a confocal optical assembly, with a monomode light source delivering a flat wave front; a transverse scanning optical deflector; a separator constructed for separating the incident beam directed towards the medium carrying the line and the beam reflected by the medium; and a detector including a knife placed at the position conjugate with the focal point of the optical assembly and transversely to the line whose width is to be measured and a differential sensor placed at the position conjugate with the pupil and delivering a signal responsive to the difference of lighting on each side of the knife.

In a first embodiment of the invention, the width of the line is determined simply at its base by detecting the distance between the scanning points where the deviation of the signal with respect to a reference value (which may be zero if the base is in the middle of the linearity range) reaches a given threshold. In another embodiment, focusing is controlled by servo-adjusting the distance from the optical assembly to the medium, about the balance point of the differential sensor, so as to follow the whole profile.

BRIEF DESCRIPTION OF THE DRAWINGS

The invention will be better understood from the following description of a particular embodiment, given by way of non-limitative example. The description refers to the accompanying drawings, in which:

FIG. 1 is a general diagram showing a possible construction of a device in accordance with the invention;

FIG. 2 shows a cross-section of a line whose width is to be measured;

FIG. 3 is a diagram showing the law of variation of the standardized deviation between the amounts of light received by the two sectors of the detector in a device of the kind shown in FIG. 1, as a function of the distance between the objective lens and the line-carrying medium;

FIG. 4 shows the variation of the signal when passing over the sides of a line during scanning of the medium;

FIG. 5 shows a modification of the detector of FIG. 4;

FIG. 6 shows a possible mounting of the objective in a modification of the device of FIG. 1, for carrying out profilometry.

DETAILED DESCRIPTION OF THE INVENTION

It will be assumed that the measuring device whose general construction is shown in FIG. 1 is for measuring the width of lines oriented in a direction y on integrated circuits during manufacture of the latter. It is then desirable to use a light for which the usual photosensitive resins are opaque. Most of these resins have a high absorption between 0.35 $\mu$m, which allows one to use a light source consisting of a helium-cadmium laser whose second spectral ray is situated at 0.325 $\mu$m or a wide spectrum source (arc-lamp) filtered out above 320 nm.

The device of FIG. 1 comprises an objective lens 10 intended to be placed in the immediate proximity of the medium 12 carrying the lines to be checked, which frequently have a width at their base between 0.3 and 0.8 $\mu$m and a height slightly greater than 1 $\mu$m. This objective lens concentrates light from a monomode source on the medium in the form of a spot whose size may be reduced to about 0.3 $\mu$m without difficulty, and for returning reflected light. It is placed so that its focal point is level with the base of line 13, whose width L at the base thereof is to be measured (FIG. 2). The light beam from the point on medium 12 confronting the objective lens 10 and which is in the object plane of the objective (focusing plane) passes through the pupil 14 of the objective lens and to an optical insulator 16, generally formed by a polarizer and a quarter wave plate, or by glasses using the Farady effect, for reducing the transmission of the backscattered light.

The light beam then passes through two deflectors 18 and 20, respectively for scanning in two mutually orthogonal directions x and y in the plane of the medium. Galvanometric deflectors will generally be used, for the scanning speed limitation which they involve is not troublesome for almost all the contemplated uses and, in addition, there exists no acousto-optical deflectors available at the present time in the ultraviolet range. These deflectors are controlled by respective ramp generators 22 and 24, which may be considered respectively as line and image scanning generators.

The light from deflector 20 is sent by a separator 26 (semi-transparent mirror for example) to a dioptric enlargement system 30 which illuminates a detector 33.

In a conventional confocal assembly, a pin-hole diaphram having a size smaller than that of the diffraction spot, forming a spatial filter, is placed between the dioptric system 30 and the detector 33, at the conjugate of the focal plane of the objective lens.

Light energy for illuminating the object plane is supplied by a source delivering a flat wave front, which may be a laser or a spectrally and spatially filtered arc-lamp 28; the source delivers a parallel light beam which passes through the semi-transparent mirror 26, deflectors 20 and 18, separator 16 and objective 10.

As shown in FIG. 1, the device of the invention comprises, in a plane conjugate with the pupil 14, a knife 32 whose edge is oriented transversely to the line whose width is to be measured and is situated on the optical axis of the dioptric system 30 and a detector 33. Detector 33 is then a photodetector with two sectors, delivering two signals S1 and S2, for example a dual sector silicon photodiode. Thus a detection system is formed using Foucault's method. A diaphragm formed with a hole 35 having a diameter of about ten times the size of the diffraction spot is advantageously placed against the knife, the hole being centered on the return image of the laser beam (shown with dash-dot lines in FIG. 1). Then very good rejection of the light backscattered into the optical system is obtained without changing the signal collected by detector 33 over a field depth of about 2 $\mu$m.

The signals S1 and S2 are applied to analog-digital sampling converters 34 by the digital ramp generators 22 and 24. These converters deliver 8-bit words for example, each representing a pixel, to a storage unit 36 connected to a computer 38 for processing the signal. This computer is arranged for delivering an output of the form:

$R = (S1 - S2)/(S1 + S2)$ for each pixel.

Experience has shown that, when the objective 10 is focused on the medium, i.e. on the plane at the base of the line, the variation of R as a function of the height along direction z is as illustrated in FIG. 3. The variation comprises a substantially linear range $\Delta z$, corresponding to a portion of a law of variation such that R passes from $-1$ to $+1$ for a range z0 substantially equal to $1.2\lambda/\alpha^2$ ($\lambda$ being the wave length of light and $\alpha$ being the numerical aperture).

When medium 12 is scanned along axis x, the output signal delivered by the processing computer 38 may consequently be illustrated by a variation curve of the kind shown in FIG. 4, to the extent that objective lens 10 is focused on the base of medium 12 and the upper half of the zone of linearity (FIG. 3) corresponds to the lower part only of the line.

The curve may be displayed on a monitor 40. The height h of the line (FIG. 2) being greater than the linear range, only the zones of the signal corresponding to the sides of the line close to the base are significant, where the signal is not saturated.

To determine the width L, the signal may be compared with a threshold S. The width L will be equal to the distance D between two successive cross-over passages through the threshold S, plus a constant calibration value. The result obtained is independent of the reflectivity of the material forming the medium and the line, due to the standardization obtained by dividing the error signal S1−S2 by S1+S2.

By way of example, it may be mentioned that the linear range $\Delta z/2$ is about 0.2 $\mu$m for a numerical aperture $\alpha = 0.95$ and a wave length of 0.3 to 5 $\mu$m. Such a linear range makes it possible to obtain satisfactory results for lines having a height exceeding one micron.

Instead of a silicon diode, which gives satisfactory results in visible light, other detectors may be used such as a dual sector photomultiplier, when working in ultra-violet light and when the energy level required by the diode would result in inadmissible exposure to light of the photosensitive resin.

In the modification shown in FIG. 5, the knife-detector assembly consists of knife 32, a right angled prism 48 with chamferred dihedron angle and two sensors 50, formed for example by photomultipliers. The knife could be formed by the sharp edge of prism 48, having surfaces treated to make them reflecting, but this latter solution may cause problems. The prism will generally be mounted to be adjustable along direction x only, whereas knife 32, fast with diaphragm 35 is advantageously adjustable along directions x, y and z.

The method of using the device of FIG. 1 is clear from the structural construction and there is then no need to describe it.

When it is desired not only to measure the width of a line at the base thereof, but further to obtain the profile of the line, or even the profile of successive lines, the available linear range is not sufficient. But then the position of the objective lens can be controlled so that it "tracks" the level of the surface of the medium.

In the embodiment shown in FIG. 6, the objective lens is carried by a plate 42 rotating about an axis 44 under the action of a jack 46 having an optical encoder (not shown). Approximate focusing of the objective at the level of the base of the line is obtained initially by a so-called "self-focusing" device of known construction using for example a 0.78 $\mu$m laser. Jack 46 is then controlled first of all to bring the signal error (S1−S2) / (S1+S2) to a constant value and then to maintain it so during scanning in direction x. Measurements may thus be made in a more extended height range greater than the linear range (since it is limited by the stroke of the jack only). The profile measured is very close to the actual geometric profile, since the slope of the linear portion is very steep and the range for a variation of R from $-1$ to $+1$ does not exceed 0.4 $\mu$m in a typical device.

The entire disclosure of French Patent Application Serial No. 89 06805 filed May 24, 1989, is hereby incorporated by reference herein.

I claim:

1. A method for optical measurement of the width of a line having lateral sides projecting out of or recessed on a surface of a medium, including the steps of: generating a light beam from a transverse monomode light source; scanning the surface of the medium along a direction orthogonal to the line with said light beam through a confocal optical system; during said scanning, measuring variations of an electrical output signal of a differential detector associated with a blade optically conjugated with the focal point of the optical system and oriented orthogonally to the line, and deriving the profile at a base of the sides of the line from said variations in a linearity zone of the measurement.

2. Device for measuring the width of a line projecting out of or recessed on a surface of a medium, comprising:
- a confocal optical assembly having a pupil and a monomode light source delivering a light beam having a flat wave front;
- a scanning optical deflector for scanning said surface transversely to said line with said beam;
- a separator arranged for separating the light beam directed towards the medium carrying the line and a reflected light beam reflected by the medium;
- and detector means including a blade placed at a position conjugate with the focal point of the optical assembly and orthogonal to the line whose width is to be measured and a differential sensor placed at a position conjugate with the pupil of the optical assembly and delivering a signal responsive to the difference of lighting on each side of the blade.

3. Device according to claim 2, wherein said detector means further includes means for determining the width of the line at the base thereof by detecting the distance between the scanning points where an amount of deviation of the differential signal from said sensor with respect to a reference value reaches a predetermined threshold.

4. Device according to claim 3, wherein said differential signal is equal to the difference between amounts of light received by two sectors of said differential sensor divided by the sum of the amounts of the light received.

5. Device according to claim 2, having means for servo-controlling focusing by servo-adjusting the distance from the optical assembly to the medium, about the balance point of the differential sensor, so as to follow the profile of the line.

6. Device according to claim 4, wherein said sensor has two photosensitive detectors delivering two reflective light responsive signals to respective analog-to-digital converters connected to memory means and to computation means for computing a standardized value of said differential signal.

7. Device according to claim 2, wherein said optical assembly has objective lens carried by driving means and provided with means for measuring the position of the objective lens in the scanning direction.

* * * * *